(12) United States Patent
Burklow

(10) Patent No.: US 9,063,166 B1
(45) Date of Patent: Jun. 23, 2015

(54) WIND DIRECTION AND ORIENTATION APPARATUS AND METHOD

(71) Applicant: Melvin A. Burklow, Pace, FL (US)

(72) Inventor: Melvin A. Burklow, Pace, FL (US)

(*) Notice: Subject to any disclaimer, the term of this patent is extended or adjusted under 35 U.S.C. 154(b) by 0 days.

(21) Appl. No.: 13/874,894

(22) Filed: May 1, 2013

(51) Int. Cl.
*G01P 13/00* (2006.01)
*G01P 13/02* (2006.01)

(52) U.S. Cl.
CPC ............. *G01P 13/0006* (2013.01); *G01P 13/02* (2013.01)

(58) Field of Classification Search
USPC ........................................ 73/170.01–170.05
See application file for complete search history.

(56) References Cited

U.S. PATENT DOCUMENTS

| | | | | |
|---|---|---|---|---|
| 4,080,826 | A * | 3/1978 | Perretta | 73/170.07 |
| 4,597,287 | A * | 7/1986 | Thomas | 73/170.03 |
| 4,790,255 | A * | 12/1988 | Shively et al. | 114/97 |
| 5,734,102 | A * | 3/1998 | Stevens | 73/170.05 |
| 5,811,673 | A * | 9/1998 | Kwok et al. | 73/170.05 |
| 2007/0034001 | A1* | 2/2007 | Hutson et al. | 73/170.01 |
| 2009/0266156 | A1* | 10/2009 | Baker-Mill | 73/170.01 |

* cited by examiner

*Primary Examiner* — Andre Allen
(74) *Attorney, Agent, or Firm* — J. Nevin Shaffer, Jr.

(57) ABSTRACT

A wind direction and orientation apparatus and method consists of a support shaft with a first end and a second end. A pointer is connected with the first end for identifying direction and an indicator is connected with the second end where, when exposed to wind, the indicator moves in the direction of the wind.

19 Claims, 3 Drawing Sheets

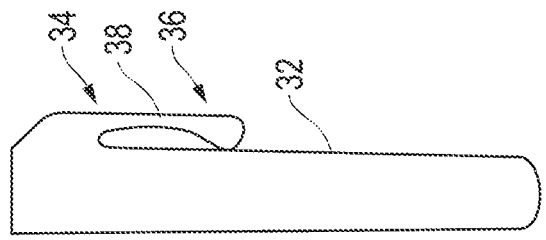
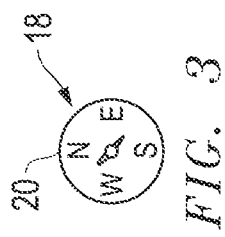
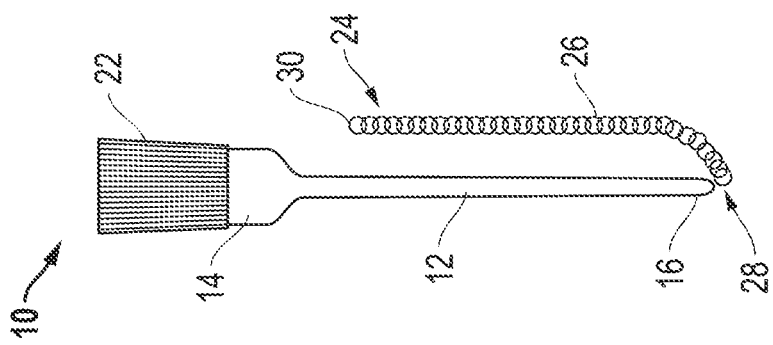
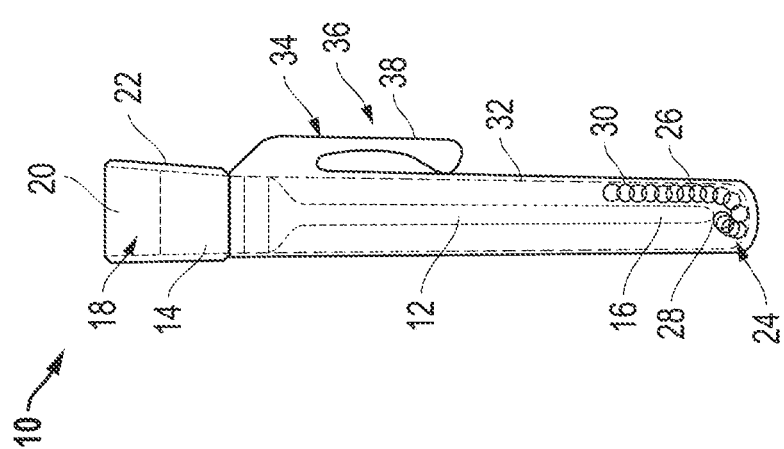

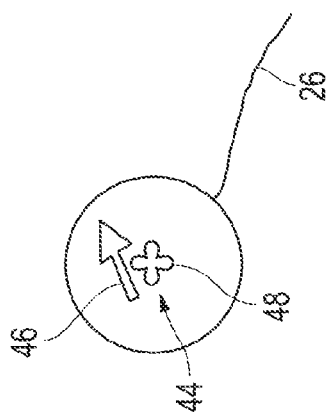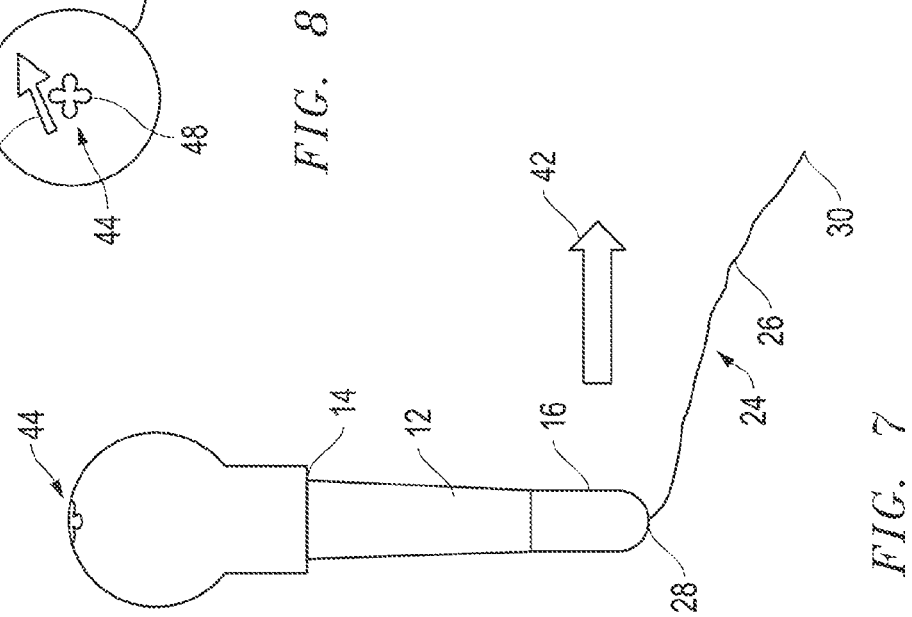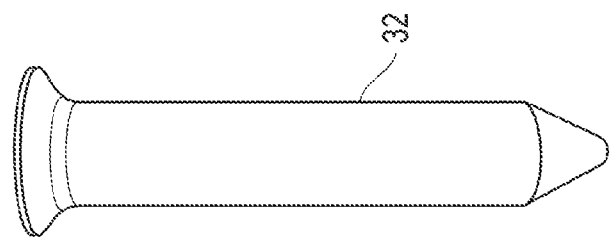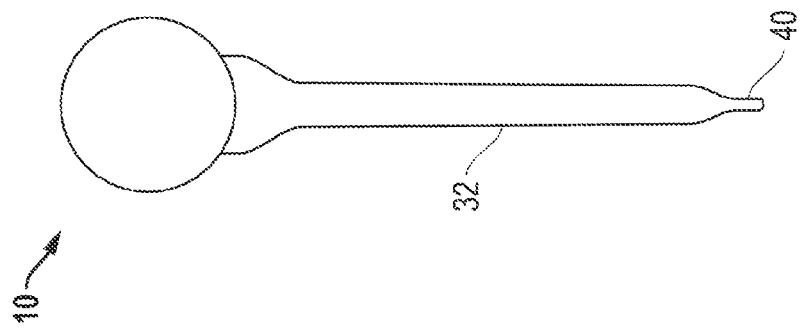

WIND DIRECTION AND ORIENTATION APPARATUS AND METHOD

FIELD OF THE INVENTION

This invention relates to a wind direction and orientation apparatus and method. In particular, in accordance with one embodiment, the invention relates to a wind direction and orientation apparatus consisting of a support shaft with a first end and a second end. A pointer is connected with the first end for identifying direction and an indicator is connected with the second end where, when exposed to wind, the indicator moves in the direction of the wind.

BACKGROUND OF THE INVENTION

A problem exists with regard to the effective use of many devices in outdoor environments. For example only and not by way of limitation, hunters often miss targets due to wind causing the shot to be pushed off of the target. The same is true for golfers. Currently, the state of the art is to pull up some grass and throw it up in the air and watch. The temporary image of blown grass is then used to attempt to determine what direction the wind is coming from and blowing to. Further, the hunter/golfer, for example only, must also attempt to relate the fleeting image to a target such that the shot may be adjusted to allow for wind moving, the shot off target. That is, not only is it important to know where the wind is coming from and going toward but it is often critical to relate that information to a particular "target".

As such, the prior art of which the Applicant is aware is woefully inadequate. It, therefore, is an object of the present invention to provide a device that indicates not only wind direction in a repeatable and reusable manner but also, at the same time, provides an easy to use target pointer device such that the wind direction is easily referenced to a particular target.

SUMMARY OF THE INVENTION

Accordingly, the wind direction and orientation apparatus of the present invention, according to one embodiment, includes a support shaft with a first end and a second end. A pointer is connected with the first end for identifying direction and an indicator is connected with the second end where, when exposed to wind, the indicator moves in the direction of the wind.

All terms used herein are given their common meaning. Thus, the term "pointer" is used to describe a device for aiming or aligning the invention at or with another object. Further, the term "the indicator moves in the direction of the wind" is used to describe an element of the invention, an indicator, that responds to the presence of moving air or wind by moving in the same direction of the wind all as will be more fully described hereafter and illustrated by the figures herein.

In one aspect of this invention, the pointer is an image. Here the term "image" is given its common meaning to describe a figure that is connected with or drawn on or applied to the first end. Any image may serve the function such as an arrow pointing in one direction, for example only.

In another aspect, the pointer is a compass. The term "compass" is used to describe a device that indicates magnetic north as is known in the art and not described more fully hereafter.

In one aspect, the indicator is a length of light weight, flexible material. As used herein, the term "light weight, flexible material" is used to describe material that is easily moved by, and quickly responds to, wind such as a cloth or plastic thread, for example only and not by way of limitation. In, this regard, in a further aspect, the light weight, flexible material is a length of non-memory yarn. In one aspect a weight is connected with the free second end of the indicator and in a further aspect the weight is in the form of a light device.

In one aspect, the invention further includes a bottom cap conformed to contain the indicator within the bottom cap and further that the bottom cap is conformed to removably connect with the support shaft. In another aspect, the bottom cap further includes a tool. In one aspect, the bottom cap tool is an attachment device and in another aspect, the bottom cap tool is screw driver tip.

According to another embodiment, a wind direction and orientation apparatus consists of a support shaft with a first end and a second end. A pointer is connected with the first end for identifying direction. A hanger device is connected with the first end. An indicator and an indicator attachment tip are provided where the indicator is connected with the indicator attachment tip and the indicator attachment tip is connected with the second end where, when exposed to wind, the indicator moves in the direction of the wind. A top cap conformed to cover the pointer is provided and the top cap is conformed to removably connect with the support shaft. And a bottom cap conformed to contain the indicator within the bottom cap is provided and the bottom cap is conformed to removably connect with the support shaft.

In one aspect of this invention, the pointer is a compass. In another aspect, the indicator is a length of light weight, flexible material. In a further aspect, the indicator attachment tip includes an attachment slot conformed to trap the indicator and hold the indicator and where the attachment tip is removably connectable with the second end.

In another aspect, the bottom cap further includes a tool. In a further aspect, the bottom cap tool is an attachment device and the bottom cap tool is screw driver tip. In another aspect a weight is added to the second end of the indicator.

According to another embodiment, a wind direction and orientation method consists of the steps of:

a. providing a support shaft with a first end and a second end; a pointer connected with the first end for identifying direction; and an indicator connected with the second end where, when exposed to wind, the indicator moves in the direction of the wind; and b. exposing the indicator to the wind while pointing the pointer toward a target.

In another embodiment, the pointer is a compass and further includes the step of using the compass to identify wind direction and target direction.

In one aspect, the invention further includes a bottom cap conformed to contain the indicator within the bottom cap and the bottom cap is conformed to removably connect with the support shaft. In another aspect, the bottom cap further includes a tool and in another aspect, a weight is connected with the second end of the indicator.

DESCRIPTION OF THE DRAWINGS

Other objects, features and advantages of the present invention will become more fully apparent from the following detailed description of the preferred embodiment, the appended claims and the accompanying drawings in which:

FIG. 1 is a side sectional view of the wind direction and orientation apparatus according to a preferred embodiment;

FIG. 2 is a side view of the invention of FIG. 1 with the bottom cap off and the wind indicator exposed while the top cap is on FIG. 3 is a top view of the invention of FIG. 1 with the top cap removed so as to expose the pointer in the form of a compass;

FIG. 4 is a side view of a bottom cap;

FIG. 5 is a side view of another embodiment of the invention with a bottom cap with a tool;

FIG. 6 is a side view of the bottom cap of FIG. 5 removed from the support shaft;

FIG. 7 is a side view of the invention of FIG. 5 showing the wind indicator exposed to wind;

FIG. 8 is a top view of FIG. 5 showing the pointer of the invention in the form of an arrow and an image.

DETAILED DESCRIPTION OF THE INVENTION

Figure 9:
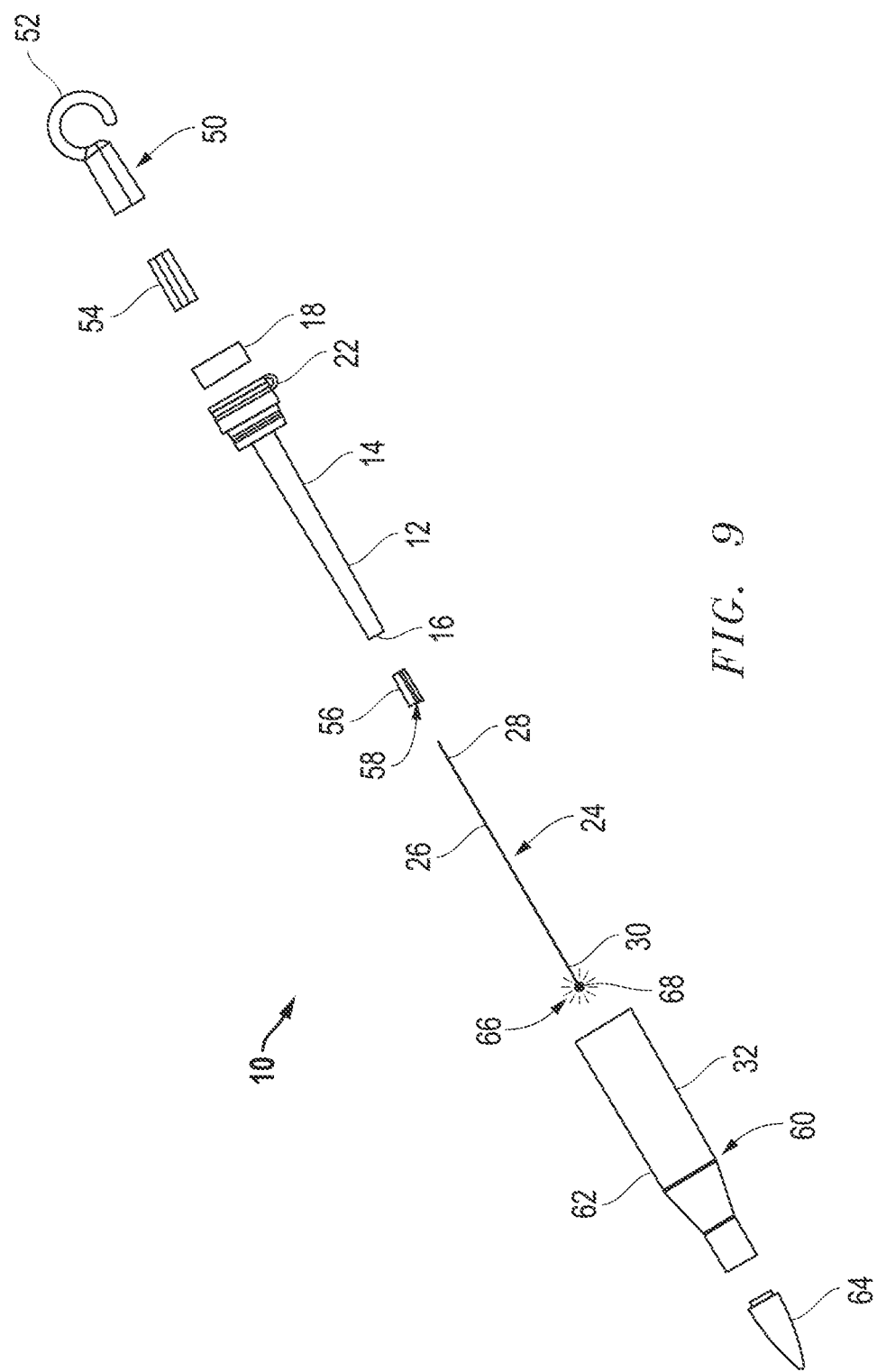
FIG. 9 is an exploded view of another embodiment of the invention illustrating a hanger device connected to the first end of the support shaft and a removable attachment tip.

The preferred embodiment of the present invention is illustrated by way of example in FIGS. 1-9. With specific reference to FIGS. 1-4, wind direction and orientation apparatus and method 10 includes a support shaft 12. Support shaft 12 has a first end 14 and a second end 16. Support shaft 12 may be in any form or shape but is essentially an elongated shaft that is rigid. By "rigid" it is understood that support shaft 12 maintains its shape when stressed, bent or manipulated in the same way a pencil or pen shaft is rigid, for example only and not by way of limitation.

Pointer 18 for indicating direction is connected with first end 14 of support shaft 12. In this embodiment, pointer 18 is a compass 20 (see FIG. 3). Pointer 18, in whatever form, is used to relate one item, a target for example, with wind direction as will be discussed more fully hereafter.

Pointer 18 preferably is protected and covered by a top cap 22. Top cap 22 is conformed to removably attach to and connect with first end 14 of support shaft 12. Compass 20 when covered by top cap 22 is protected from damage and dirt and such. When it is desired to use compass 20, top cap 22 is easily detached. In that regard, top cap 22 may be connected by cooperating threads, or snaps or straps or any other manner now known or hereafter developed.

Indicator 24 is connected with the second end 16 of support shaft 12. Indicator 24 is any device that, when exposed to wind, moves in the direction of the wind. Preferably indicator 24 is a light weight, flexible indicator 26 such as non-memory yarn for example only. Indicator 26 can be any light weight, flexible indicator, such as a thread of cloth or plastic, but it must be easily visible.

Indicator 24 may be connected with support shaft 12 with glue or any other useful connection material or system. Thus, a first end 28 of indicator 24 is glued, for example only, to second end 16 of support shaft 12 while the second end 30 of indicator 24 is left free to follow the wind. One important aspect of the invention involves the replacement of indicator 24 as may be necessary over time with use. This feature of the invention will be more fully disclosed with regard to the discussion of FIG. 9.

In a preferred embodiment, bottom cap 32 is provided. Bottom cap 32 is conformed, as is top cap 22 when provided, to removably connect with support shaft 12. Bottom cap 32 covers, protects and stores indicator 24 when bottom cap 32 is connected with support shaft 12 (See FIG. 1). When bottom cap 32 is removed (See FIG. 2) the indicator 24 is released and the second end 30 is free to follow the wind.

FIG. 4 shows an embodiment of the invention in which bottom cap 32 includes a tool 34. As shown in FIGS. 1 and 4, in one embodiment, tool 34 is an attachment device 36. Attachment device 36 may be a clip 38. Clip 38 is used, as is known, to secure the bottom cap 32 in place as, for example only, in a user's pocket (not shown) along with the bottom cap 32 when it is connected with support shaft 12.

Referring now to FIGS. 5-8, another embodiment of the invention is illustrated. FIG. 5 shows a wind direction and orientation apparatus 10 with only a bottom cap 32. Bottom cap 32 includes a tool 34 in the form of a screw driver tip 40. While the form of wind direction and orientation apparatus 10 may be any useful form, FIG. 5 shows it in the form of a golf ball on a golf tee. The bottom cap 32 when attached as in FIG. 5 or when removed as in FIG. 6, may be used as a divot repair tool or as a screw driver to attach and detach spikes on golf shoes (not shown) for example only. Certainly any useful tool may satisfy the requirements of this aspect of the invention.

FIG. 7 shows the invention of FIG. 5 with the bottom cap 32 removed. Light weight flexible indicator 26 is connected at first end 28 to support shaft 12 as described above. Second end 30 is shown responding to wind blowing in the direction of direction arrow 42. FIG. 8 is a top view that shows pointer 18 in the form of an image 44. Image 44 may be any useful image such as an arrow 46 or a four leaf clover 48, for example only. Importantly, wind direction and orientation apparatus 10 enables the user to relate the observed wind direction indicated by indicator 24 to a target (not shown) by aligning the image 44, such as arrow 46, to the target. At the same time, the user observes indicator 26 and can adjust his shot to compensate for the wind direction. Thus, by means of the present invention, at that point, the user is in possession of a combination of data. The user knows the wind direction relative to the target, all with the use of a compact device that is useable over and over again.

Certainly, the embodiment of FIGS. 5-8 may include a removable top cap 22 and compass 20 as desired. In whatever embodiment, the device provides a readily accessible wind direction and orientation apparatus 10 in a single compact unit. The device provides a protected, reusable, repeatable combination wind direction and orientation system.

Referring, now to FIG. 9, other features and advantages of Applicant's wind direction and orientation apparatus and method 10 are disclosed. In FIG. 9, a hanger device 50 is shown. Hanger device 50 includes a hook 52. Hanger device 50 is connected with the first end 14 of support shaft 12 by any convenient method and means. As shown hanger device 50 is connected to hanger insert 54 and hanger insert 54 is connected with the first end 14 of support shaft 12 in any convenient location. In the exploded view of FIG. 9, hanger insert 54 is designed to be connected to top cap 22 covering compass 18. When assembled, compass 18 fits within the space covered by top cap 22 and hanger insert 54 is connected to the top cap 22, for example only. Importantly, hanger device 50 enables a user to attach wind direction and orientation apparatus 10 to a tree branch, for example only, by means of hook 52. Thereafter, when indicator 24 is exposed to the wind, by removal of bottom cap 32, a constant indication of wind direction is provided. A hunter need only glance at the indicator 24 from time to time as needed without having to repeatedly take out the device and disassemble it for use.

Another important feature of the invention is illustrated in FIG. 9 concerning indicator 24 and replacement of indicator 24 as needed. As mentioned above, from time to time indicator 24 will need to be replaced. It may be satisfactory to simply cut off and glue a new indicator 24 to the second end 16 of support shaft 12. However, this is a cumbersome and messy solution requiring a user to have both the replacement indicator 24 and glue available. Thus, in this embodiment, indicator attachment tip 56 is provided. Indicator attachment tip 56 is conformed to removably connect with the second end 16 of support shaft 12. This removable connection can be made by press fit, screw threads or any desired means and method. Importantly, once removed, a new indicator 24 is attached to indicator attachment tip 56 which is then reconnected to the second end 16 of support shaft 12. Preferably, indicator 24 is connected to indicator attachment tip 56 without glue by means of an attachment slot 58. Attachment slot 58 runs at least partially down the length of attachment tip 56. The free first end 28 of indicator 24 is inserted in attachment slot 58 and pulled into it and wedged in place, for example only. Thereby, a rapid replacement of indicator 24 is provided in which the only requirement is another fresh piece of indicator 24. This feature greatly enhances the usefulness of the invention in harsh environments where it is likely that indicator 24 may be snagged and torn as on trees and bushes, for example only.

FIG. 9 when assembled takes the form hunters recognize the shape of a cartridge 60 in which bottom cap 32 is in the form of a cartridge casing 62 and the cartridge casing includes a bullet shaped tip 64, for example only. As stated above, any useful form of the elements of the invention as are suitable for the purposes and function of the invention are included within the scope of the invention.

Still referring to FIG. 9, another aspect of the invention is disclosed. Weight 66 may be attached to the free second end 30 of indicator 24 and/or 26. Applicant has found that in some cases, as in high wind situations, for example, it is useful to add weight 66 such that indicator 24 and/or 26 slightly resists movement with the wind. Still further, in some instances Applicant has found that it is useful for weight 66 to be a fiber optic light 68. In low light situations it is very useful to be able to see the end 30 of indicator 24 or 26. The term "fiber optic light" is used to describe a light weight, low energy light device as known but may be any such device now known or hereafter developed.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A wind direction and orientation apparatus comprising:
    a. a support shaft with a first end and a second end;
    b. a pointer connected with said first end wherein said pointer is fixed in relation to said first end and moves with said first end for aligning the first end with an object and wherein said pointer does not move when exposed to wind;
    c. an indicator connected with said second end wherein when exposed to wind said indicator moves in the direction of said wind and in combination with said pointer the direction of the wind relative to said object is identified and wherein said indicator is a length of light weight, flexible string material attached at one end to the second end of the shaft and with another, unattached, free end; and
    d. a bottom cap conformed to contain said indicator within said bottom cap and wherein said bottom cap is conformed to removably connect with said support shaft.

2. The apparatus of claim 1 wherein said pointer is an image.

3. The apparatus of claim 1 wherein said pointer is a compass.

4. The apparatus of claim 1 further including a weight connected with said unattached free end of said indicator.

5. The apparatus of claim 4 wherein the weight is a light device.

6. The apparatus of claim 5 wherein said bottom cap further includes a tool.

7. The apparatus of claim 6 wherein said bottom cap tool is an attachment device.

8. A wind direction and orientation apparatus comprising:
    a. a support shaft with a first end and a second end;
    b. a pointer connected with said first end wherein said pointer is fixed in relation to said first end and moves with said first end for aligning the first end with an object and wherein said pointer does not move when exposed to wind;
    c. a hanger device connected with said first end;
    d. an indicator connected on one end with an indicator attachment tip wherein said indicator attachment tip is connected with said second end wherein the indicator includes an unattached free end such that when exposed to wind said indicator moves in the direction of said wind and in combination with said pointer the direction of the wind relative to said erect is identified;
    e. a top cap conformed to cover said pointer wherein said top cap is conformed to removably connect with said support shall; and
    f. a bottom cap conformed to contain said indicator within said bottom cap and wherein said bottom cap is conformed to removably connect with said support shaft.

9. The apparatus of claim 8 wherein said pointer is a compass.

10. The apparatus of claim 8 wherein said indicator is a length of light weight, flexible material.

11. The apparatus of claim 8 wherein said indicator attachment tip includes an attachment slot conformed to trap said indicator and hold said indicator and wherein said attachment tip is removably connectable with said second end.

12. The apparatus of claim 8 wherein said bottom cap further includes a tool.

13. The apparatus of claim 12 wherein said bottom cap tool is an attachment device.

14. The apparatus of claim 8 further including a weight connected with said unattached free end of said indicator.

15. A wind direction and orientation method comprising:
    a. providing a support shaft with a first end and a second end; a pointer connected with said first end wherein said pointer is fixed in relation to said first end and moves with said first end for aligning the first end with an object and wherein said pointer does not move when exposed to wind; and an indicator connected with said, second end wherein when exposed to wind said indicator moves in the direction of said wind and in combination with said pointer the direction of the wind relative to said object is identified and wherein said indicator is a length of light weight, flexible string material attached at one end to the second end of the shaft and with another, unattached, free end and a bottom cap conformed to contain said indicator within said bottom cap and wherein said bottom cap is conformed to removably connect with said support shaft; and
    b. exposing said indicator to said wind while pointing the pointer toward said object.

16. The method of claim 15 wherein said pointer is a compass and farther including the step of using said compass to identify wind direction and target direction.

17. The method of claim 15 further including, a weight connected with said unattached, free end of said indicator.

18. The apparatus of claim 14 wherein said weight is a light device.

19. The method of claim 15 wherein said weight is a light device.

* * * * *

UNITED STATES PATENT AND TRADEMARK OFFICE
CERTIFICATE OF CORRECTION

| | | |
|---|---|---|
| PATENT NO. | : 9,063,166 B1 | Page 1 of 1 |
| APPLICATION NO. | : 13/874894 | |
| DATED | : June 23, 2015 | |
| INVENTOR(S) | : Burklow | |

It is certified that error appears in the above-identified patent and that said Letters Patent is hereby corrected as shown below:

In the specification
Column 1, Line 27: "moving, the shot" should read --moving the shot--.

In the claims
Column 6, Line 28, Claim 8: "erect" should read --object--.
Column 6, Line 31, Claim 8: "shall" should read --shaft--.

Signed and Sealed this
Fifteenth Day of December, 2015

Michelle K. Lee
*Director of the United States Patent and Trademark Office*